United States Patent [19]

Rouse et al.

[11] Patent Number: 4,560,112
[45] Date of Patent: Dec. 24, 1985

[54] SCRAP SHREDDING APPARATUS HAVING CUTTER DISCS OF DIFFERENT THICKNESS

[75] Inventors: Michael W. Rouse, West Linn; Robert L. Thelen, Woodburn, both of Oreg.

[73] Assignee: Waste Recovery, Inc., Dallas, Tex.

[21] Appl. No.: 607,225

[22] Filed: May 4, 1984

Related U.S. Application Data

[62] Division of Ser. No. 318,041, Nov. 5, 1981, abandoned.

[51] Int. Cl.$^4$ ................................................ B02C 7/04
[52] U.S. Cl. ................................. 241/236; 241/294; 241/166; 241/DIG. 31
[58] Field of Search ............... 241/166, 167, 196, 197, 241/205, 195, 230, 234, 235, 236, 252, 293, 294, 295, DIG. 31, 154, 300

[56] References Cited

U.S. PATENT DOCUMENTS 3,931,935  1/1976  Holman ................................. 241/24
4,329,767  5/1982  Niiti ................................. 241/182 X

FOREIGN PATENT DOCUMENTS 1057811  5/1959  Fed. Rep. of Germany ...... 241/154

*Primary Examiner*—Howard N. Goldberg
*Assistant Examiner*—Timothy U. Eley
*Attorney, Agent, or Firm*—Chernoff, Vilhauer, McClung, Birdwell & Stenzel

[57] ABSTRACT

Apparatus for comminuting scrap materials, particularly fiber-reinforced resilient materials such as scrap tires, includes a pair of generally cylindrical cutter rolls mounted for rotation with parallel cutter discs of each roll intermeshed closely between cutter discs of the cutter roll. The cutter discs on each cutter roll are of a series of thicknesses, and each cutter disc includes a plurality of cutter segments attached about its periphery. Cutter segments are reversible end-for-end to present a sharp edge for drawing scrap material between the intermeshed cutter rolls. A method of sharpening the apparatus includes removing worn cutter segments from the cutter discs, grinding lateral surfaces of each cutter segment, and thereafter fastening the cutter segments on a next thinner one of the cutter discs. Annular clearing rings surround the shaft of each cutter roll between neighboring cutter discs of that cutter roll. The clearing rings are free to move radially and have a large enough size to force cut pieces of scrap material radially outward from between the neighboring cutter discs.

10 Claims, 5 Drawing Figures

SCRAP SHREDDING APPARATUS HAVING CUTTER DISCS OF DIFFERENT THICKNESS

This application is a division of application Ser. No. 318,041, filed Nov. 5, 1981, now abandoned.

BACKGROUND OF THE INVENTION

The present invention relates to apparatus for comminuting scrap materials, particularly fiber reinforced resilient materials such as pneumatic tire casings, and to a method for sharpening such apparatus.

Several types of apparatus for reducing scrap materials to smaller pieces which may be more easily handled for disposal or reclamation of the materials are already known. Many of these apparatuses, such as those disclosed by Holman U.S. Pat. No. 3,931,935, Ehrlich et al U.S. Pat. Nos. 4,052,013 and 4,134,556, and Baikoff U.S. Pat. No. 3,991,944 are designed primarily for reducing the size of scrap tires and the like and employ rotating parallel rolls each carrying several substantially identical discs or radially extending ribs which intermesh between similar discs or ribs on the opposite roll, to shear scrap material into strips having uniform widths as the rolls are counter-rotated with respect to one another.

Edwards U.S. Pat. No. 1,178,386 and Wagner U.S. Pat. No. 4,018,392 disclose similar arrangements of smaller size usable primarily for cutting paper and the like into narrow strips.

Prolonged use of shredders such as those disclosed in the above-named patents brings about wear, dulling the edges of the radially extending ribs or discs which must cooperate with one another to shear the scrap material. Once the edges are dulled, the scrap cutting machines require greater power for operation and give generally less satisfactory results. In large apparatus designed for shredding pneumatic tire casings and the like, the cutting edges have formerly been repaired either by removal of material from the circumferential faces of the ribs as taught by Ehrlich et al, or by replacement of dulled cutting segments as taught by Holman. Replacement of segments, however, is very costly.

The radially outer surfaces of the cutter rolls may also be ground to restore sharp edges, thereby restoring some of the lost cutting efficiency, as taught by Holman and Ehrlich, et al. Sharpening these tire cutting apparatuses by grinding the peripheral surfaces, however, has only marginally extended the period of usefulness of the cutter segments and ribs, because wear of the side faces of the radially extending discs and ribs increases the lateral clearance between adjacent ribs or discs. The increased clearance has an effect apparently greater than that of dulled edges, decreasing the shearing efficiency of the machines. Wear of the sides of the sawtooth cutter discs of the Holman apparatus beneath the cutter segments also adds to the power needed to operate the machine, as scrap material tends to catch the under sides of the cutter segments.

Use of harder, tougher materials would permit the original discs or ribs to be used for a longer period. The possibility of only slightly increasing their lifetime, however, despite a large increase in cost due to use of such improved materials, has made it more economical to replace cutting ribs and cutter segments of previously known apparatus frequently than to use more expensive materials for such parts.

A long-standing problem associated with cutting resilient materials such as tire casings using apparatus such as that disclosed in the Holman and Ehrlich et al patents is that the separated pieces of resilient scrap material tend to remain between adjacent discs or ribs of the cutter rolls, interfering with cutting of additional scrap material in subsequent revolutions of the rolls. If not removed, these pieces of material can eventually stop the machine or even cause permanent damage. Cut scrap has previously been removed from tire cutters by the use of rotating clearing wheels as disclosed by Holman or by the use of fingers as disclosed by Ehrlich, et al and Holman. Such fingers prevent accumulation of material from completely jamming a scrap-cutting machine. Since material accumulates against the fingers, however, an appreciable amount of energy is still wasted overcoming friction between such material and the surfaces of the adjacent cutter discs.

Edwards U.S. Pat. No. 1,178,386 discloses stationary collars, located between the cutter discs or ribs of each cutter roll in a paper shredder. These collars act as a comb having teeth wrapped around the shaft of each of the rolls. Wagner U.S. Pat. No. 4,018,392 discloses similar collars which have freedom to move within a limited distance, floating longitudinally of the cutter roll shafts. Scrap shredding devices having such collars, however, are still subject to friction caused by accumulation of material between cutter discs.

What is needed, therefore, is a scrap shredding apparatus capable of comminuting fiber reinforced vehicle tires, which may be economically kept sharp enough for efficient operation, thereby reducing the amount of energy required to reduce scrap tires into pieces small enough for further handling, and including simple, sturdy and efficient means for removing pieces of material from between neighboring cutting discs on each respective cutting roll. Also needed is a method for periodically sharpening the apparatus to preserve efficiency of operation and extend the period of usefulness of each individual cutter segment beyond that previously possible.

SUMMARY OF THE INVENTION

The present invention provides improvements which overcome the aforementioned shortcomings and disadvantages of the previously known scrap shredding apparatus including a pair of generally cylindrical cutter rolls each incuding a shaft having a plurality of parallel cutter discs spaced along its length. Each cutter disc in the apparatus of the present invention consists of a central wheel which has an array of sharp cutter segments attached about its periphery,. The cutter rolls are supported parallel to one another for counter-rotation, with the cutter discs of the two cutter rolls intermeshed between one another. Close spacing between the sides of each cutter disc and the adjacent cutter discs of the opposite cutter roll provides for interaction of the cutter segments to shear scrap material such as sheet plastic, sheet metal, tin cans, and scrap tires.

Between the neighboring cutter discs on each cutter roll annular spacers surround the shaft, preserving a predetermined separation distance between cutter discs.

Annular clearing rings, each slightly thinner than the respective spacer are also located between the adjacent cutter discs of each cutter roll, surrounding the respective spacers. Each clearing ring has a circular opening with an internal diameter significantly larger than the external diameter of the spacer, yet significantly smaller than the external diameter of each cutter disc.

The external diameter of each clearing ring is preferably approximately equal to or slightly less than the external diameter of each cutter disc. Thus, when a clearing ring is located eccentrically with respect to the cutter roll shaft, the outer edge of the clearing ring extends beyond the periphery of the cutter discs between which it is located. The radial depth of each clearing ring, however, is sufficient to prevent a gap between the outer surfaces of the cutter segments and the interior of the clearing ring, preventing entry of scrap material into the space between the clearing ring and the spacer.

The clearing rings are self-aligning and avoid the mechanical problems associated with driving clearing rolls. The clearing rings often are able to force cut pieces of material from between adjacent cutter discs by their weight. When this does not occur, the opposing cutter disc will encounter the clearing ring, pushing it toward the opposite side of the cutter roll on which it is located, and forcing cut scrap material outward from between the neighboring cutter discs.

After considerable use, the cutter discs, and particularly the cutter segments of the cutter discs, become worn and therefore less efficient in shearing scrap material. In order to permit effective sharpening and reuse of the cutter segments used on the periphery of each of the cutter discs, in accordance with the present invention, the cutter discs are provided in several thicknesses. The cutter segments of each cutter disc match the thickness of the respective central wheel in their lateral width. Each cutter segment is secured to the periphery of the respective central wheel by fasteners such radially extending bolts which are similarly positioned on each of the cutter discs, regardless of thickness.

When the scrap shredding apparatus has become dulled through use, each dulled cutter segment is removed from its central wheel, and its lateral surfaces are dressed to a predetermined size permitting that segment to be used on a thinner central wheel. The reduction in thickness between consecutively sized cutter discs is great enough so that this resurfacing of the lateral surfaces of each cutter segment provides adequately sharp corner edges between the newly dressed side surfaces and the peripheral surface of the cutter segment. This resurfacing also provides the desired reduced clearance between the lateral surfaces of intermeshed cutter segments when the sharpened segments have been placed on the next thinner cutter disc. It is necessary to supply a new set of cutter segments for only the thickest cutter discs.

Using this method of sharpening the apparatus, the useful life of each cutter segment is extended by a factor equal to the number of thinner cutter disc sizes available. Since each cutter segment is useful for a much longer period of time, a much higher initial cost of each cutter segment is justified. As a result, more wear-resistant materials may be used economically, providing an additional factor of extended longevity of each cutter segment.

Preferably, the cutter segments of each cutter disc are of two sizes, equal numbers of each size being provided. The larger cutter segments are both longer and thicker in the radial dimension than the smaller ones, and cutter segments of the two sizes are arranged alternatingly about the periphery of the cutter disc. The cutter discs are keyed to the cutter roll shaft in an angularly staggered, helical pattern, and the opposed cutter rolls are timed to bring each large cutter segment into shearing alignment alongside a small cutter segment on the opposite cutter roll during operation of the scrap shredding apparatus. This timing, in conjunction with the relating shallow intermeshing between cutter rolls, also confines the overlapping area of the cutter discs to the lateral surfaces of the cutter segments.

Because the end surfaces of the cutter segments are radial planes, each cutter segment can be rotated end-for-end to present a sharp edge for feeding scrap material between the cutter rolls.

It is therefore a primary purpose of the present invention to provide an improved scrap shredding apparatus which operates efficiently to shred waste, scrap and recyclable material, such as fiber reinforced scrap tires, garbage, ferrous and non-ferrous metals, plastic, and the like.

It is another important purpose of the present invention to provide scrap shredding apparatus in which use of expensive improved materials for parts ordinarily subjected to wear is economically feasible.

It is a further purpose of the present invention to provide a scrap shredding apparatus including simplified provisions for removing cut scrap material efficiently from between neighboring cutter discs on a cutter roll.

It is a principal feature of the present invention that the cutter discs are of different thicknesses and include reusable cutter segments attached to the periphery of the central wheel of each cutter disc.

It is another important feature of the present invention that it provides annular clearing rings located in the spaces between neighboring cutter discs on each of a pair of parallel counter-rotating cutter rolls, each clearing ring being radially movable with respect to the shaft of the respective cutter roll to force cut material from between the cutter discs.

It is a further feature of the present invention that it provides a method of sharpening reusable cutter segments including removing material from the lateral surfaces of each cutter segment and thereafter using the resharpened cutter segments as part of a thinner one of the cutter discs.

It is yet a further feature of the present invention that it provides scrap shredding apparatus including cutter segments of two sizes mounted on each cutter roll to efficiently grasp and feed scrap material between the intermeshed counter-rotating cutter rolls.

It is a primary advantage of the present invention that it provides scrap cutting apparatus in which each cutter segment may be used for a far greater period of time than has previously been possible.

It is another important advantage of the present invention that it provides a scrap shredding apparatus which may be more compactly constructed than previously known scrap shredding apparatus including provision for positive removal of cut scrap material from between neighboring cutter discs.

It is a further advantage of the present invention that it provides scrap cutting apparatus which can be maintained in condition for efficient operation more economically than has previously been possible.

It is yet a further advantage of the present invention that it cuts scrap tires into more uniformly sized pieces than previously known scrap shredding apparatus.

BRIEF DESCRIPTION OF THE DRAWINGS

FIG. 4 is a fragmentary sectional view, at an enlarged scale, of the cutter rolls of the tire shredding apparatus shown in FIG. 1.

FIG. 5 is a pictorial view, at an enlarged scale, of a detail of one of the cutter discs of the tire shredding apparatus shown in FIG. 1.

DETAILED DESCRIPTION OF THE INVENTION

Figure 1:
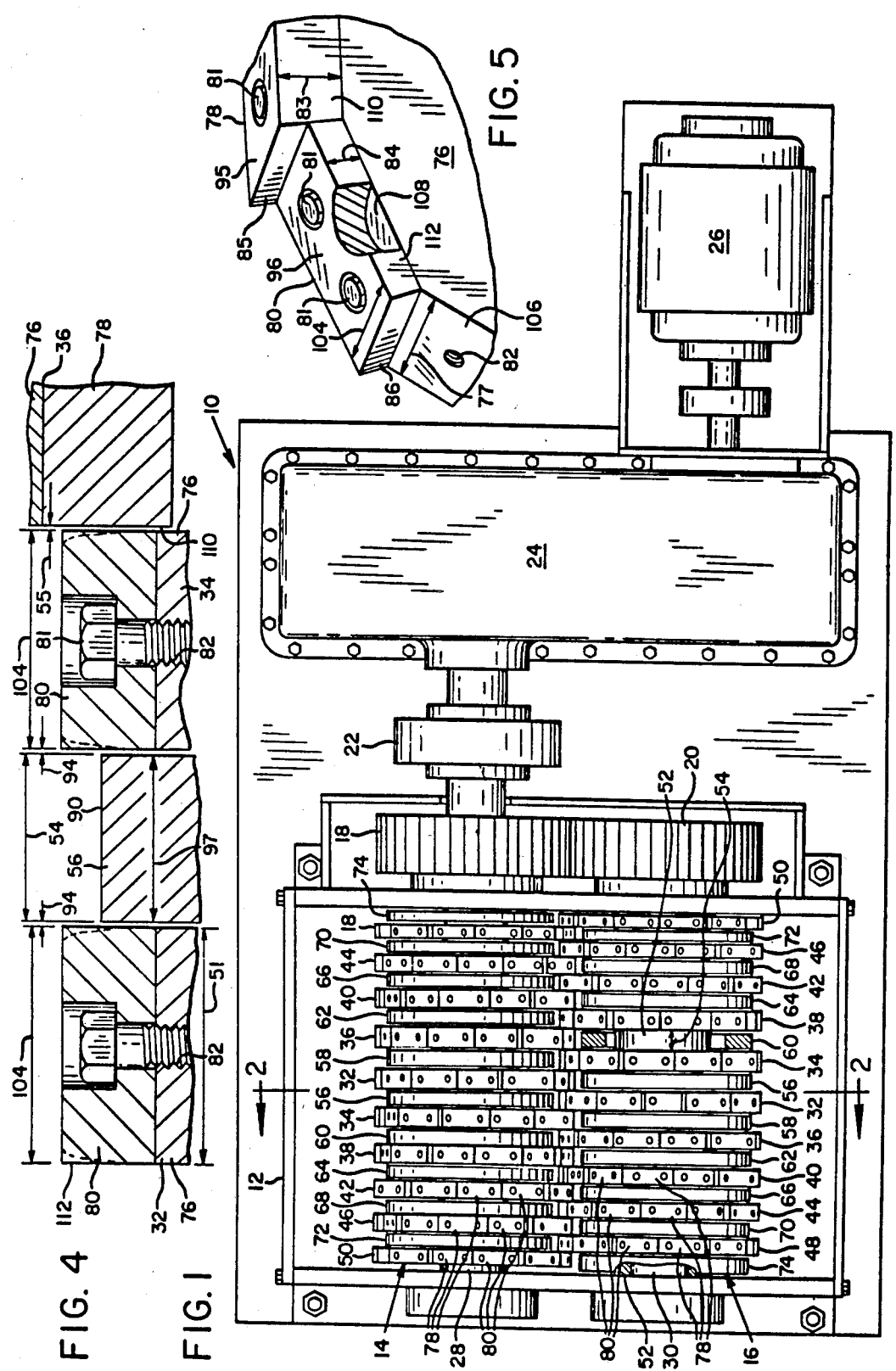
FIG. 1 is a top plan view of an exemplary tire shredding apparatus embodying the present invention.
Figure 2:
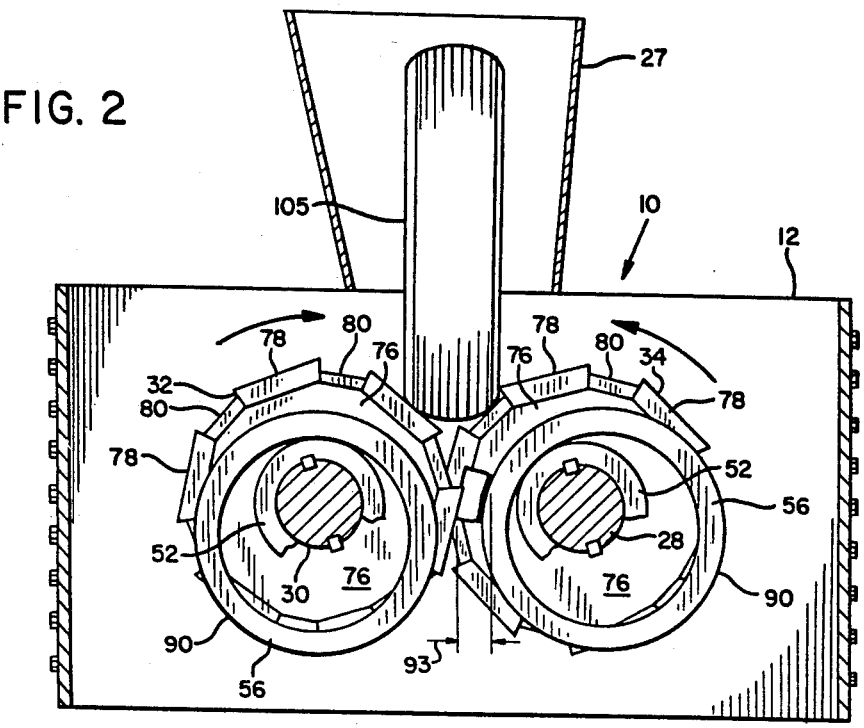
FIG. 2 is a sectional end elevational view of the tire shredding apparatus shown in FIG. 1, taken along line 2—2.
Figure 3:
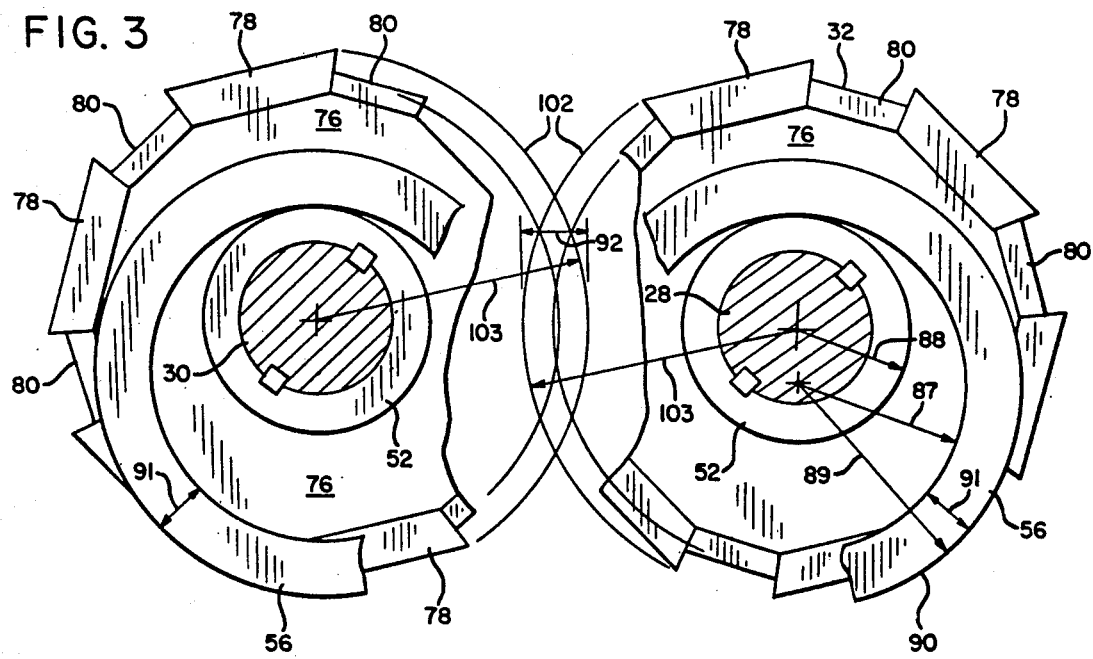
FIG. 3 is a partially cut away view of a portion of the shredding apparatus shown in FIG. 1, taken along line 2—2, at an enlarged scale.

Referring now to FIGS. 1-3 of the drawings, in exemplary tire shredding apparatus 10 is shown in top plan view in FIG. 1. It may be seen that the apparatus comprises exemplarily a cutting box 12 including a pair of opposed, intermeshed rotatably supported cutter rolls 14 and 16 driven through a pair of intermeshed timing gears 18 and 20, a coupling 22, and a speed reduction gear box 24. Any suitable motor may be used to drive the cutter rolls 14 and 16, for example a 150 horsepower electric motor 26 having suitable overload protection, with the cutter rolls 14 and 16 driven at approximately 10 rpm through the gearbox 24. A chute 27 (FIG. 2) may be provided above the cutting box 12 to guide scrap material such as discarded vehicle tires appropriately toward the intermeshed portions of the cutter rolls 14 and 16.

Each cutter roll 14 and 16 comprises a respective central shaft 28 or 30 equipped with a plurality of cutter discs 32, 34, 36, 38, 40, 42, 44, 46, 48, and 50, hereinafter called cutter discs 32-50, separated by spacers 52. Each of cutter discs 32-50 and the spacers 52 is keyed to one of the shafts 28 and 30 for rotation therewith.

Each of the cutter discs 32-50 has substantially planar sides separated by an axial thickness 51. The axial thickness 54 of each spacer 52 is approximately equal to the axial thickness 51 of the one of the cutter discs 32-50 of the other cutter roll 14 or 16 which is aligned opposite the particular spacer 52. Suitable means (not shown) is provided to retain all of the cutter discs 32-50 and spacers 52 tightly assembled in each cutting roll 14 and 16 and to provide for alignment of the cutter rolls 14 and 16 with one another, the spacers 52 assuring a very small axial clearance 55 between the sides of adjacent ones of the intermeshed cutter discs.

Situated respectively in the spaces of each cutter roll 14 and 16, between neighboring ones of the cutter discs 32-50 and surrounding the spacers 52, are respective clearing rings 56, 58, 60, 62, 64, 66, 68, 70, 72, and 74 hereinafter called clearing rings 56-74.

Referring now to FIGS. 4-5, each of the cutter discs 32-50 includes a central wheel 76 having an axial thickness 77 and a plurality of detachable cutter sements 78 and 80 attached about its periphery, for example by bolts 81 which extend radially inward through each respective segment 78 or 80 into respective threaded holes 82 in the peripheral faces 106 and 108 of the respective one of the cutter disc central wheels 76. All of the cutter discs 32-50 are of the same size and shape as viewed along the respective cutter roll shaft 28 or 30, each having, for example, six long cutter segments 78 and six short cutter segments 80.

Each of the long cutter segments 78 has a radial thickness 83 which is significantly greater than the radial thickness 84 of each of the short cutter segments 80. Each end surface 85 or 86 respectively of each cutter segment 78 or 80 extends radially with respect to the cutter roll 14 or 16. Each of the cutter segments 78 and 80 fits tightly against the respective central wheel 76 to which it is attached, and also fits tightly against the adjacent cutter segments 78 and 80 of that cutter disc, the adjacent end surfaces 85 and 86 providing mutual support for one another. Because the end surfaces are radial planes, the long cutter segments 78 may be reversed in their longitudinal orientation. This permits the cutter segments 78 to be rotated end-for-end to present the sharpest end first for engaging scrap material and pulling it into the intermeshed portions of the cutter rolls 14 and 16.

Each of the clearing rings 56-74 has an inside radius 87 which is significantly greater than the spacer radius 88 of the spacer 52 which it surrounds. An outside radius 89 of each clearing ring 56-74 is at least large enough so that the outer edge 90 of the respective clearing ring extends at least approximately to the periphery of the cutter discs 32-50 between which it is located, when the clearing ring is moved to a position of maximum eccentricity relative to the spacer 52 around which it is located. Each clearing ring 56-74 has a radial depth 91, equal to the difference between the inside radius 87 and the outside radius 89. The difference between the spacer radius 88 and the inside radius 87 must be small enough, and the radial depth 91 must be great enough, to prevent an opening to the interior of the clearing ring, when the clearing ring is in its most eccentric location. That is, the cutter segments 78 and 80 and the central wheels 76 of the cutter discs on either side of an eccentrically located clearing ring must cover the entire area circumscribed by the interior of the clearing ring, to prevent entry of scrap material within the clearing ring.

Since the cutter rolls 14 and 16 are intermeshed with one another, however, the clearing rings 56-74 must be free to move radially with respect to the shaft 28 or 30 and the spacers 52 to an eccentric position providing clearance for a cutter disc of the opposite cutter roll 14 or 16, plus the thickness 93 of the scrap material being cut. This relationship assures sufficient room for cut scrap material to pass downward between the faces of two neighboring ones of the cutter discs 32-50, the outer edge 90 of the clearing ring of one cutter roll, and the cutter segments 78-80 of an intermeshing cutter disc of the opposite cutter roll. Thus when clearing ring and cutter disc diameters are alike, the clearing ring must be free to move eccentrically a distance at least equal to the intermesh distance 92 plus the thickness 93 of a piece of scrap material.

As seen best in FIG. 4, sufficient lateral clearance 94 is provided between each clearing ring 56-72 and the cutter discs 32-50 between which it is located, to permit the clearing ring normally to hang downward with its interior surface in contact with the uppermost surface of the respective spacer 52. For example, the axial thickness 97 of each clearing ring may be as much as approximately 0.125 inch less than the distance between the adjacent cutter discs.

In a preferred embodiment of the apparatus of the invention the cutting box 12 may have interior dimensions of 50 inches by 74 inches with the shafts 28 and 30 being 8 inches in diameter and spaced 25 inches apart, center to center. Each of the cutter discs 32-50 measures 25.75 inches between the exterior flat surfaces 95 of the long cutter segments 78 and 25.25 inches between the exterior flat surfaces 96 of the short cutter segments 80 on opposite sides of the respective cutter discs. Each of the long cutter segments 78 is 9.625 inches long, measured along the exterior flat surface 95, and has a radial thickness 83 of 2 inches. Each short cutter segment 80 is 4.25 inches long, measured along the exterior flat surface 96, and has a radial thickness 84 of 1 inch. Each of the spacers 52 has a press fit around the respective shaft 28 or 30 and has a radius 88 of 6 inches, concentric with the shaft on which it is located.

Each clearing ring 56-74 in the preferred embodiment of the apparatus 10 has an inside radius 87 or 9 inches and an outside radius 89 of 11.5 inches, with inside and outside surfaces also concentric with one another. The clearing ring is thus free to move radially 3 inches in any direction from a position of concentricity with the respective cutter roll, so that the outside of the clearing ring can extend as much as 2.125 inches beyond the exterior flat surface 96 of each short cutter segment 80. This still leaves the inner 0.375 inch of the radial depth 90 of the clearing ring protected by the short cutter segment 80 to prevent entry of scrap material between the interior of the particular clearing ring and the exterior of the spacer 52 which it surrounds.

On each cutter roll 14 and 16 the tips of the long cutter segments 78 define a tip circle 102 establishing a cutter roll radius 103 of approximately 13.75 inches, and an intermeshing distance 92 equal to 2.5 inches, leaving sufficient room for material up to about 2.75 inches thick to pass between the tips of the long cutter segments 78 and the exterior surface of the clearing rings.

The cutter discs 32-50 are graduated in axial thickness 51, with the cutter segments 78 and 80 on each cutter disc having a lateral width 104 which is equal to the axial thickness 77 of the respective central wheel 76. Preferably the cutter discs 32, located nearest the center of each cutter roll 14 and 16, are the thickest, with each cutter disc 34, 36, 38, 40, 42, 44, 46, 48, and 50, hereinafter called cutter discs 34-50 being thinner than any other cutter disc closer to the center of the respective cutter roll 14 or 16. For example, cutter disc thicknesses 51 may be as shown in TABLE 1:

TABLE 1

| CUTTER DISC | THICKNESS |
| --- | --- |
| 32 | 2.9 inches |
| 34 | 2.8 inches |
| 36 | 2.7 inches |
| 38 | 2.6 inches |
| 40 | 2.5 inches |
| 42 | 2.4 inches |
| 44 | 2.3 inches |
| 46 | 2.2 inches |
| 48 | 2.1 inches |
| 50 | 2.0 inches |

The associated spacers 52 between neighboring cutter discs are similarly graduated in their axial thickness 54 to provide, preferably, less than 0.005 inches clearance 55 between the sides of adjacent intermeshed cutter disc central wheels 76 and the cutter segments 78 and 80 which are mounted thereon, although larger clearances, up to as much as about 0.030 inches, can be tolerated.

Preferably the cutter discs 32-50 are provided with keyways located so that the angular position of each cutter disc on the respective central shaft is rotationally offset from that of the next cutter disc on the same cutter roll, forming a helically staggered arrangement of the cutter discs on each cutter roll, the direction of the helix being opposite on the cutter roll 14 from that on the cutter roll 16. Each cutter segment 78 or 80 is thus angularly offset from the position of a closest similar cutter segment on the closest neighboring cutter discs.

The timing gears 18 and 20 provide for rotating the cutter rolls at equal speeds in opposite directions. Additionally, the cutter rolls are timed with respect to one another so that each of the long cutter segments 78 of the cutter roll 14 passes closely alongside one of the short cutter segments 80 on the adjacent cutter discs of the cutter roll 16, and vice versa. As a result, each tire 105 or other piece of scrap material being cut is subjected to a reciprocating motion as it passes downward between the cutter rolls 14 and 16.

Because the axially thicker cutter discs 32 and 34 are located in the center of each cutter roll 14 and 16, tires may be cut into more uniformly sized pieces. Since tires normally pass through the shredding apparatus edge first, in the direction of a diameter of the tire, a tire 105 is cut in a nearly radial direction by the center of the cutter rolls.

Portions of the tire sidewall located further than the tire bead from the diameter along which the tire is moving may be cut into relatively long closed loops. Use of thinner ones of the cutter discs 34-50 closer to the ends of each cutter 14 or 16 reduces the overall size of such loops and also reduces the likelihood of pieces of tire tread material passing through between neighboring cutter discs without being cut into narrow strips.

The bolt holes 82 for the bolts 81 used to secure each of the cutter segments 78 and 80 to the respective ones of the cutter disc central wheels 76 are centrally located with respect to the axial thickness 77 of each central wheel 76. The bolt holes 82 are similarly located on each of the peripheral faces 106 and 108 of the central wheels 76, so that each cutter segment 78 or 80 can be secured to any of the central wheels 76.

As shown in broken line in FIG. 4, after long use, each of the cutter segments 78 and 80 becomes worn on its lateral surfaces 110 and 112, the material eventually eroding away to a shape indicated with some exaggeration by the broken line. This process of wearing increases the axial clearance 55 between lateral surfaces 110 and 112 of adjacent cutter segments 78 and 80, reducing the efficiency of shearing of scrap material and thereby increasing the amounts of power necessary to operate the apparatus. Because of the timing of the cutter rolls 14 and 16 relative to one another, and the shallow depth of intermeshing of the cutter rolls 14 and 16, the cutter segments 78 and 80 overlap one another, but not the central wheels 76 of the adjacent cutter discs, thus avoiding erosion of the central wheels 76 beneath cutter segments 78 or 80. As a result, the power required to operate the apparatus is not increased by scrap material catching between adjacent cutter disc central wheels 76 beneath the cutter segments 78 or 80.

When the cutter segments 78 or 80 are worn, the scrap shredding apparatus 10 of the present invention may be sharpened, restoring cutting efficiency practically to its original level, by removing each of the worn cutter segments 78 and 80 from its respective cutter disc central wheel 76 and removing material from each of the lateral surfaces 110 and 112 of the cutter segments 78 and 80. Material is removed by grinding or milling to reduce the lateral width 104 of the cutter segment 78 or 80 to the designed thickness of a thinner one of the cutter discs 34–50, taking care that material is removed in such a way as to preserve the relationship between the lateral surfaces 110 and 112 and the centrally located bolt holes 82. This restores sharp edges on the cutter segments, as shown in FIG. 4. The cutter segments 78 and 80 are then fastened to the next thinner central wheel 76, whose thickness they match.

Once the cutter segments have been thus sharpened and reinstalled on different central wheels 76 as part of the cutter discs 34–50, the cutter segments 78 and 80 removed from the cutter discs 32 must be replaced by new cutter segments 78 and 80 having the appropriate lateral width 104 to match the axial thickness 77 of the central wheels 76 of the cutter discs 32.

In the exemplary apparatus described above, then, it is necessary to remove only a maximum of 0.050 inches thickness of material from each lateral face 110 or 112 of each cutter segment 78 or 80 to reduce its size to match the thickness of the next thinner central wheel 76, simultaneously restoring sharp edges and reducing the axial clearance 55 between adjacent cutter segments 78 and 80 of the intermeshed cutter rolls 14 and 16.

Each cutter segment 78 and 80 is preferably manufactured of D2 or D3 tool steel, with a Rockwell "C" hardness in the range of approximately 60 to 62. Use of such highly wear resistant materials in the apparatus of the invention is made economical, despite the increased cost of material and machining, by the reusability provided by the graduated thicknesses of the cutter discs 32–50. The graduated thicknesses 51 of the cutter discs 32–50 in the present apparatus permit sharpening and reuse of each cutter segment 78 and 80 as many as nine times. The central wheels 76, the spacers 52, and the clearing rings 56–72 are subjected to less abrasion and may be of less durable materials.

While a preferred embodiment of the invention has been disclosed, it may be practical to employ a rotating clearing roll including toothed discs intermeshed between the cutter discs of each cutter roll and rotated in the same direction, instead of the clearing rings disclosed herein, without foregoing the advantages provided by use of cutter discs of graduated axial thicknesses along with sharpenable cutter segments.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for comminuting scrap and waste material including reinforced resilient materials such as vehicle tires, comprising:
    (a) cutting means, including an intermeshed pair of rotatably mounted, generally cylindrical cutter rolls, each of said cutter rolls including a central shaft and a plurality of cutter discs fastened thereon for rotation therewith and separated axially from one another therealong, said cutter rolls being intermeshed with one another such that a plurality of said cutter discs of each of said cutter rolls extend radially between said cutter discs of the other of said cutter rolls, for cooperatively shearing said materials into pieces;
    (b) drive means for counter-rotating said intermeshed cutter rolls about their respective axes;
    (c) each of said cutter discs including a central wheel fixedly located on the respective central shaft;
    (d) each of said central wheels having an axial thickness and a periphery;
    (e) a plurality of detachable outer portions fastened to the periphery of each said central wheel, each of said outer portions having an axial width substantially equal to the axial thickness of the respective central wheel to which it is fastened, and having respective lateral surfaces and exterior surfaces defining edges at the intersections thereof; and
    (f) the axial thickness of at least a first one of said central wheels being greater than the axial thickness of at least one other one of said central wheels by at least an amount sufficient to permit respective ones of said detachable outer portions to be used while fastened to said first one of said central wheels until said ones of said detachable outer portions are worn to an unsatisfactory conditions, and to permit said ones of said detachable outer portions to be sharpened to a satisfactory condition by removal of material from their respective lateral surfaces and to have an axial width substantially equal to the axial thickness of said second one of said central wheels after so being sharpened.

2. The apparatus of claim 1, wherein some of said central wheels are of a plurality of different axial thicknesses, said different axial thicknesses varying from each other by at least 0.030 inch.

3. The apparatus of claim 1, wherein some of said central wheels are of a plurality of different axial thicknesses, said different axial thicknesses varying from each other by at least 0.1 inch.

4. The apparatus of claim 1, wherein different ones of said central wheels have at least three different respective axial thicknesses, each of said different axial thicknesses varying from each other of said different axial thicknesses by at least 0.030 inch.

5. The apparatus of claim 1, wherein different ones of said central wheels have at least three different respective axial thicknesses, each of said axial thicknesses varying from each other of said different axial thicknesses by at least 0.1 inch.

6. The apparatus of claim 1, wherein the ones of said central wheels located on one of said central shafts have at least two different respective axial thicknesses, each of said different axial thicknesses being at least 0.030 inch different from at least one other.

7. The apparatus of claim 6, wherein each of said different axial thicknesses is at least 0.1 inch different from at least one other.

8. The apparatus of claim 1, wherein the ones of said central wheels located on each of said central shafts have at least two different respective axial thicknesses, each of said different axial thicknesses being at least 0.030 inch different from at least one other.

9. The apparatus of claim 8, wherein each of said different axial thicknesses is different from at least one other of said different axial thicknesses by at least 0.1 inch.

10. The apparatus of claim 8, wherein the ones of said central wheels having the greatest of said different axial thicknesses are located centrally along the respective central shafts, and the others of said central wheels are arranged along said central shafts in decreasing order of axial thickness on both sides of said ones of said central wheels having the greatest of said different axial thicknesses.

* * * * *

UNITED STATES PATENT AND TRADEMARK OFFICE
CERTIFICATE OF CORRECTION

PATENT NO. : 4,560,112

DATED : December 24, 1985

INVENTOR(S) : Michael W. Rouse et al.

It is certified that error appears in the above-identified patent and that said Letters Patent is hereby corrected as shown below:

| | |
|---|---|
| Col. 3, line 34 | After "such" insert --as-- |
| Col. 5, line 20 | Change "in" to --an-- |
| Col. 7, line 17 | Change "or" to --of-- |
| Col. 8, line 33 | After "cutter" insert --roll-- |
| Col. 10, line 20 | Change "conditions" to --condition-- |
| Col. 10, line 22 | After "sharpened" insert --thereafter-- |

Signed and Sealed this

Twenty-ninth Day of July 1986

[SEAL]

Attest:

Attesting Officer

DONALD J. QUIGG

Commissioner of Patents and Trademarks